April 7, 1931.  E. W. HOLMES  1,800,020
HYDRAULIC LIFT
Filed Oct. 9, 1929  4 Sheets-Sheet 1

April 7, 1931.   E. W. HOLMES   1,800,020
HYDRAULIC LIFT
Filed Oct. 9, 1929   4 Sheets-Sheet 2

INVENTOR
Ernest W. Holmes
BY

ATTORNEY

Patented Apr. 7, 1931

1,800,020

UNITED STATES PATENT OFFICE

ERNEST W. HOLMES, OF CHATTANOOGA, TENNESSEE, ASSIGNOR TO ERNEST HOLMES COMPANY, OF CHATTANOOGA, TENNESSEE, A CORPORATION OF TENNESSEE

HYDRAULIC LIFT

Application filed October 9, 1929. Serial No. 398,461.

The present invention relates to improvements in automobile lifts and more especially to those of the class embodying a frame over which the automobile to be lifted is placed and which is elevated by a hydraulic piston or similar means to lift the automobile while resting on the frame.

One of the objects of the invention is to provide the lifting frame of a lift of this class with guide rails at its sides to cooperate with the wheels of the automobile while the latter is being driven or otherwise placed thereover and to thereby insure centering of the automobile in a direction transversely of the frame so that when the automobile is lifted by the frame it will occupy a stable position thereon and will not be subject to slipping or tilting laterally, the guide rails being capable of retraction toward or against the respective sides of the frame after the automobile has been placed thereon, thereby avoiding obstruction to the steering movement of the front wheels of the automobile for inspection or adjustment while lifted and affording accessibility to the different parts of the lifted automobile to the workmen or attendants.

In the preferred embodiment of the invention, means is provided which automatically retracts the guide rails when fluid pressure or power is applied to lift the frame, so that the guide rails will clear the brake drums and other parts of the automobile as the frame rises to engage it and will avoid obstructing the under side of the automobile while lifted, and means is provided for automatically extending the guide rails into operative position after the lifting frame has been fully lowered, so that the guide rails will guide the automobile while it is being driven or otherwise removed from above the lowered frame and will be in position to guide another automobile while being driven into position above the lowered frame preparatory to the lifting of such automobile.

Another object of the invention is to provide, in an automobile lift using a hydraulic piston operated by compressed air acting on a body of oil or other liquid for elevating the lifting frame, a valve which will close automatically and thus prevent air reaching the under side of the piston when the latter reaches or approaches the limit of its upward stroke, thereby insuring support of the elevated piston by the incompressible oil or liquid so that bouncing of the elevated automobile, which would occur if air reached the under side of the piston, is avoided.

To these and other ends, the invention consists in certain improvements and combinations and arrangements of parts all as will be hereinafter more fully described, the features of novelty being pointed out particularly in the claims at the end of the specification.

In the accompanying drawings:—

Similar parts are designated by the same reference characters in the different views.

The automobile lift in its preferred form and as shown in Figures 1 to 8 inclusive comprises a lifting frame 1 adapted to occupy a position immediately above the floor or ground X when lowered so that an automobile may be driven or otherwise placed above it, and a hydraulic cylinder sunk vertically beneath the floor or ground and having a piston 3 movable vertically therein and acting on the lifting frame so that when the piston is forced upwardly in the cylinder, the lifting frame will rise so that it will come into supporting relation with the automobile above it, and as the rise of the lifting frame continues, the latter will lift the automobile to a desired height above the floor or ground. The piston is preferably cylindrical in form so that the lifting frame may rotate about the center of the piston and thus serve as a turntable.

The lifting frame is preferably of the type which is adapted to engage the under sides of the front and rear axles of the automobile, leaving the wheels thereof free and projecting beyond the sides of the frame. The frame is composed in the present instance of a pair of longitudinal rails 4 which may be composed of I-beams to insure sufficient strength and rigidity, these side rails midway of their length being bolted or otherwise secured to top and bottom plates 5 which plates are welted or otherwise secured to the upper end of the piston 3, the top plate 5 providing a fluid-tight closure for the upper end of the piston, the axis of the piston being midway between the side rails of the frame so that the weight of an automobile resting on the frame will be distributed equally at opposite sides of the piston.

The ends of the side rails which extend in one direction from the piston are preferably free of transverse connections so that they will provide a large and unobstructed space between them which will afford convenient access to the under side of the forward end of an automobile which is adapted to rest upon this end of the frame. The ends of the side rails which extend in the opposite direction from the piston and which are adapted to be placed beneath the rear end of an automobile are preferably connected by a pair of transverse tie bars 6 over which are placed angle irons 7 which span the space between the side rails 4, the flanges of the angle irons sloping downwardly in opposite directions from points above the respective tie bars, and the transverse angle irons 7 are connected by a pair of laterally spaced longitudinally extending angle irons 8, these longitudinal angle irons being located equidistantly at opposite sides of the longitudinal center of the lifting frame and spaced apart a proper distance to form a cradle which will receive the under side of the differential housing of the rear axle of an automobile. The inner sides of the angle irons 8 slope downwardly and inwardly to conform approximately with the shape of the usual differential housing and to prevent displacement of such housing transversely from a position between these longitudinal angle irons, and these longitudinal angle irons are of sufficient length to compensate for automobile having wheel bases of different lengths.

Figure 1:
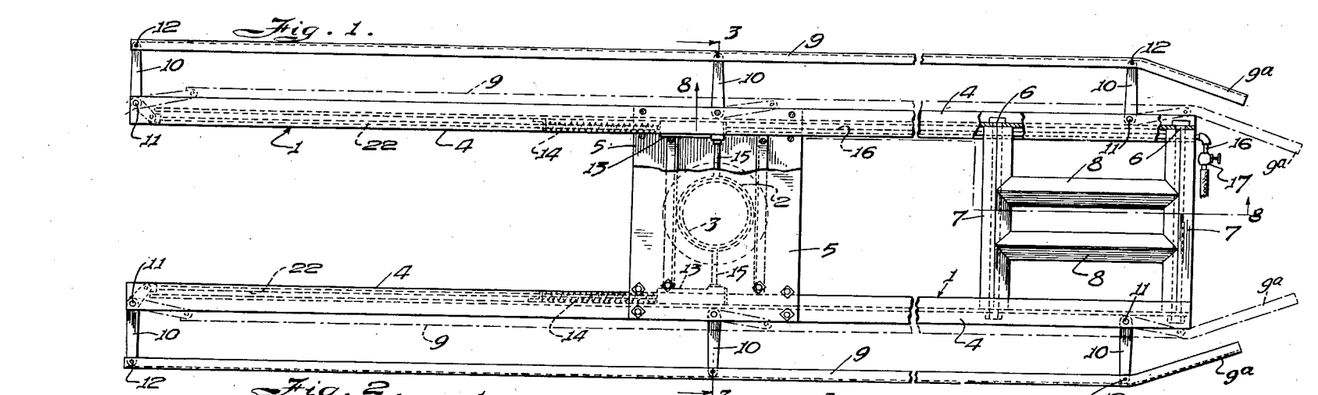
Figure 1 is a top plan view of an automobile lift of the hydraulic type embodying the present invention, portions of the structure being broken away, or shown in section.
Figure 2:
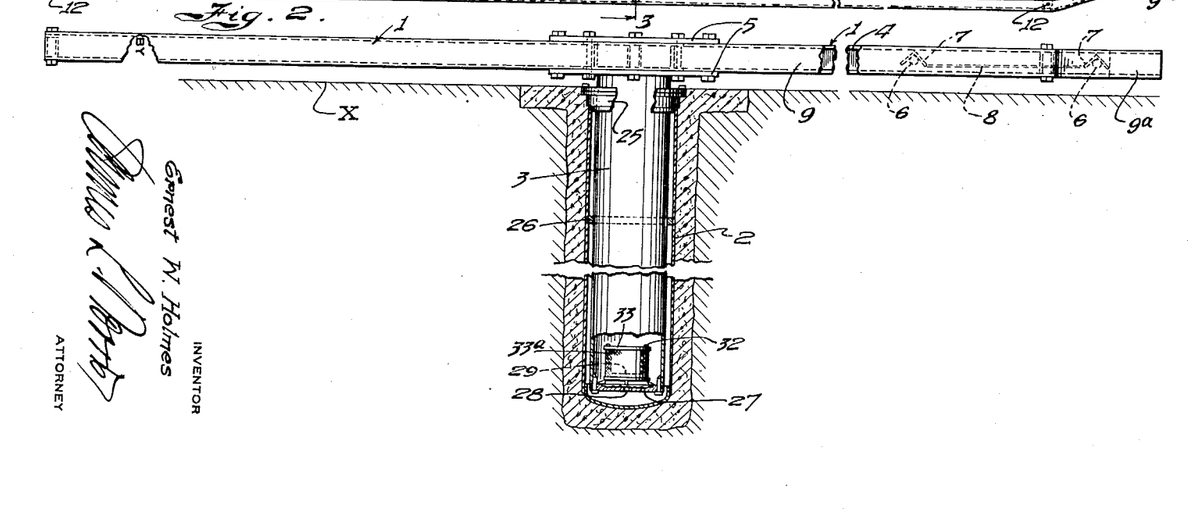
Figure 2 represents a side elevation of the lift shown in Figure 1, the hydraulic cylinder and part of the piston being shown in section and portions of the cylinder and piston and lifting frame being broken away.

The transverse angle irons 7 which connect the ends of the longitudinal angle irons 8 to provide abutments which will prevent the differential housing from slipping off either the forward or the rear ends of the longitudinal angle irons 8. The space between the longitudinal angle irons 8 serves to expose the drain plug usually provided in the bottom of the differential housing of an automobile, thereby affording the required accessibility for the draining of oil from the differential housing. It will be understood from the foregoing, that the left hand end of the lifting frame in Figures 1 and 2 is adapted to engage beneath the front end of an automobile, the side rails 4 engaging the under side of the front axle of the automobile and the right hand portion of the frame shown in those figures is adapted to occupy a position beneath the rear end of the automobile, this portion of the automobile being supported on this end of the frame by the resting of the differential housing of the automobile upon the longitudinal angle irons 8. It will be further understood that when the lifting frame is fully lowered, it will occupy a position immediately above the floor or ground level so that it will clear the axles of the automobile while being driven to or from a position above the frame and that the initial part of the elevating movement of the lifting frame will bring the latter into lifting engagement with the under sides of the front axle and the differential housing.

In a lifting frame of the kind described above, the side rails 4 are spaced sufficiently close together to allow the automobile wheels to travel in paths beyond the outer sides of the frame while the automobile is being placed above and removed from a position above the frame and to allow the automobile wheels to project freely and to a substantial distance beyond the sides of the frame when the latter and an automobile thereon are in elevated position. In order to properly lift the automobile by the frame, the side rails of the frame must engage the straight portion of the front axle at points inside of the usual upwardly off-set ends thereof and the angle irons 8 must occupy positions substantially equidistantly of the opposite sides of the differential housing of the rear axle. When an automobile is so mounted on the frame it will occupy a stable position thereon and will not be subject to slipping or tilting laterally on the frame which, if permitted to occur, would damage or endanger the safety of the automobile.

The present invention provides means which will insure proper centering of the automobile laterally on the frame when the automobile is brought into a position above the frame preparatory to the lifting operation, although such means will not obstruct the running gear or other parts of the automobile and thus interfere with the proper inspection, adjustment or servicing thereof, after the automobile has been elevated, and in the preferred embodiment of the invention, the automobile centering means is automatically retracted before the lifting frame rises, so that there will be no danger of damaging the brake drums or other parts of the automobile by the centering means when the lifting operation takes place, and the centering means is automatically restored to its extended or operative position after the lifting frame has been fully lowered, so that the centering means will then be in position to guide the automobile which is to be removed from above the lifting frame and to properly center another automobile as it is brought into position above the lifting frame preparatory to lifting thereof.

The centering means in its preferred construction and as shown in the present instance comprises a pair of guide rails 9 which extend longitudinally at the sides of the respective side rails 4 of the lifting frame, and a series of levers 10 which are pivoted at 11 to the respective side rail 4 and at 12 to the respective guide rail 9, these levers when swung about their pivots 11 carrying the guide rails either into the extended positions shown by the full lines in Fig. 1 or into the retracted positions shown by the dotted lines in that figure, the levers 10 being parallel so that they will maintain the guide rails 9 at all times in parallelism with the respective side rails 4 of the frame. When the guide rails are extended, the distance between the outer sides of the guide rails is only slightly less than the distance between the tires of the wheels at the opposite sides of an automobile, and since the guide rails 9, when extended, project equidistantly beyond the side rails of the frame, they will insure the location of the longitudinal center of the automobile directly above the longitudinal center of the lifting frame and hence the automobile in being driven into a position above the lifting frame will be centered transversely therefrom. When the guide rails 9 are retracted, as shown by the dotted lines in Fig. 1, they will occupy collapsed positions in close relationship with the outer sides of the side rails 4 of the frame, and when the guide rails are retracted, they will be removed inwardly from the wheels of the automobile so that they will not come into contact with the brake or other parts of the running gear of the automobile and they will not interfere with free access to the automobile wheels or other parts of the running gear thereof and they will not interfere with steering movements of the front wheels of an automobile resting on the lifting frame.

In order to properly direct the automobile wheels so that they will travel at the outer sides of the guide rails while the automobile is being brought into position above the lifting frame, the ends 9ª of the guide rails at the rear end of the lifting frame are bent or inclined inwardly, these inclined ends of the guide rails serving to direct the automobile front wheels into proper positions at the outer sides of the guide rails.

Different means may be employed for extending and retracting the guide rails but it is preferable to provide means which will automatically extend the guide rails when the lifting frame is fully lowered and to automatically retract the guide rails when power is applied to raise the lifting frame. In the present instance where hydraulic means is employed for raising the lifting frame, a fluid pressure cylinder 13 is provided for retracting each guide rail when fluid pressure is applied to elevate the lifting frame, and a spring 14 is provided for extending each guide rail when the lifting frame is fully lowered and the fluid pressure is cut off. The cylinder 13 for each guide rail is connected to a pipe 15 which is in communication with the space in the upper end of the piston 3, the space in the upper end of the piston being always in communication with the cylinders 13 through pipes 15 and a pipe 16 communicates with one of the cylinders 13 and it serves to supply and exhaust compressed air employed to cause lifting and lowering of the lifting frame, the pipe 16 being connected by a flexible hose or other suitable means to an appropriate source of compressed air supply and being provided with a suitable controlling valve 17.

Each cylinder 13, which is fixed to the inner side of the frame side rail 4, contains a piston 18 which is reciprocable axially therein and each of these pistons is attached to a rod 19 which is guided to reciprocate in a guiding bracket 20 fixed to the inner side of the frame said rail 4 and is pivotally connected by the forked pivot joint 21 to a rod 22, the latter being pivotally connected at 23 to an inwardly extending arm 24 on one of the levers 10. The spring 14, which is of the helical compression type, encircles the piston rod 19 and bears at its ends against the piston 18 and the relatively fixed guide 20 respectively.

Figure 6:
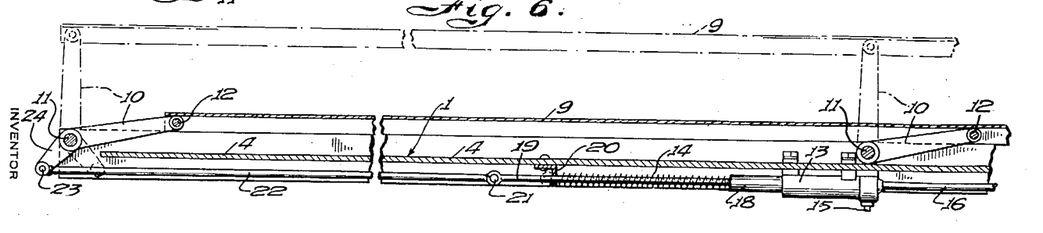
Figure 6 represents a horizontal section taken longitudinally through one of the side rails of the lifting frame and the adjacent guide rail, a portion of the length of these rails being broken away, this figure showing the guide rail retracted and extended by the full and dotted lines respectively.
Figure 7:
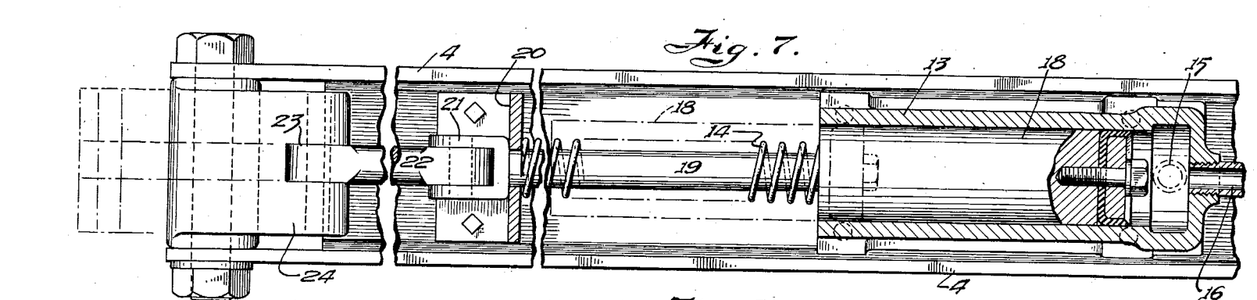
Figure 7 is a detail view on an enlarged scale and partly in section, showing the fluid actuated piston and spring for retracting and extending one of the guide rails.
Figure 8:
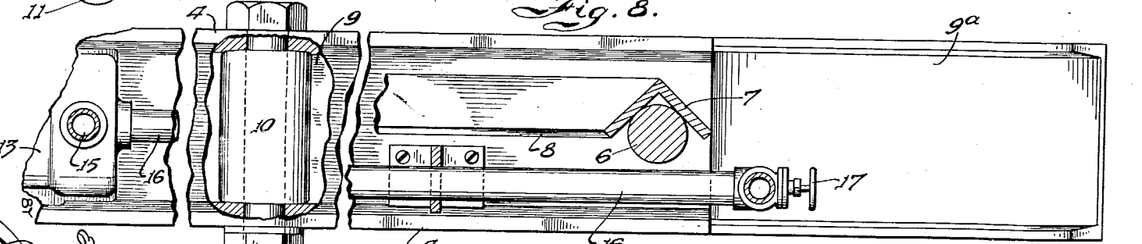
Figure 8 represents on an enlarged scale a vertical section taken on the line 8—8 of Figure 1, portions being broken away.

In the construction just described, the pistons 18 will occupy their innermost positions within the cylinders 13 when the lifting frame is fully lowered at which time the cylinders and the lifting piston are free of pressure of the lifting fluid, and the pistons 18 will be maintained in such positions by the expansive action of the springs 14, and the tension thus applied to the rod 22 acting on the respective lever 10 will hold the corresponding guide rail in its extended position as represented by the dotted lines in Figure 6. When compressed air or fluid pressure is supplied to the pipe 16 to elevate the lifting frame, the pistons 18 which will be subject to such pressure will be pushed out of their cylinders against the compression of the spring 14, and the thrust imparted to the rod 22 connected to each of these pistons will act to swing the levers 10 to which these rods are connected in a direction to retract the guide rails against the respective sides of the lifting frame, as shown by the full lines in Figure 6.

It will thus be seen that the springs 14 will hold the guide rails in extended positions at the outer sides of the lifting frame while the latter is in its fully lowered position so that the guide rails may properly function to insure centering of an automobile while the latter is being brought into a position above the frame, but as soon as fluid pressure is applied to elevate the lifting frame into engagement with the automobile above it the guide rails will be retracted so that they will be drawn inwardly away from the brake drums and other parts of the running gear of the automobile adjacent to the wheels thereof so that the guide rails cannot engage and damage the brake drums or other parts of the running gear of the automobile. As the supply of compressed air or fluid pressure continues, the lifting frame, after coming into engagement with the automobile above it, will lift the automobile, and since the fluid pressure continues to act upon the pistons 18 for the entire period the automobile is lifted, the guide rails will be maintained in retracted position against the sides of the lifting frame and hence the guide rails will be in a position where they will not interfere with access to the under side of the lifted automobile for inspection, adjustment or other purposes.

When the automobile is lowered by releasing the compressed air or lifting fluid, the pistons 18 will remain in their actuated positions until after the automobile has come to rest upon the floor or ground and the lifting frame has been lowered out of contact with the automobile and has reached its lowermost position, at which time the compressed air has been substantially completely exhausted so that the springs 14 will be able to force the pistons 18 into their cylinders and to swing the guide rails outwardly into their extended positions. It will be understood of course that the strength of the springs 14 is such that these springs will be unable to force the pistons 18 inwardly against the fluid pressure required to support the weight of the lifting frame alone, so that these springs can act to extend the guide rails only after the compressed air or fluid pressure has been reduced sufficiently to allow the lifting frame to reach or rest in its lowermost position.

The piston 3 which serves to elevate the lifting frame passes through a stuffing box 25 at the upper end of the cylinder 2 and it is guided to reciprocate vertically therein by a guide ring 26 which is secured within the cylinder near its upper end and slidably engaged by the piston. The piston is hollow and is adapted to contain a body of oil or other suitable incompressible liquid, and the lower end of the piston is closed by a head 27 which has an aperture 28 therein which forms communication between the interior of the piston and the cylinder. The piston is elevated to raise the lifting frame by supplying compressed air at suitable pressure to the pipe 16, the air so supplied entering the upper end of the hollow piston through one of the pipes 15 and acting on the surface of the body of oil therein to force the oil out of the hollow piston and into the cylinder through the intercommunicating passage or aperture 28, this aperture being relatively small or restricted so that it will have a dash pot action upon the oil which will prevent sudden dropping of the piston in the event the air supply fails although permitting descent of the piston at a proper rate to lower the lifting frame when the compressed air is exhausted from the upper end of the piston. The present invention provides means operative automatically to prevent compressed air used in raising the piston from passing out of the bottom of the piston and into the cylinder and thereby reaching the under side thereof and which, if permitted to occur, would provide an elastic body under the piston which would permit it to bounce when elevated.

Figures 3, 4, 5:
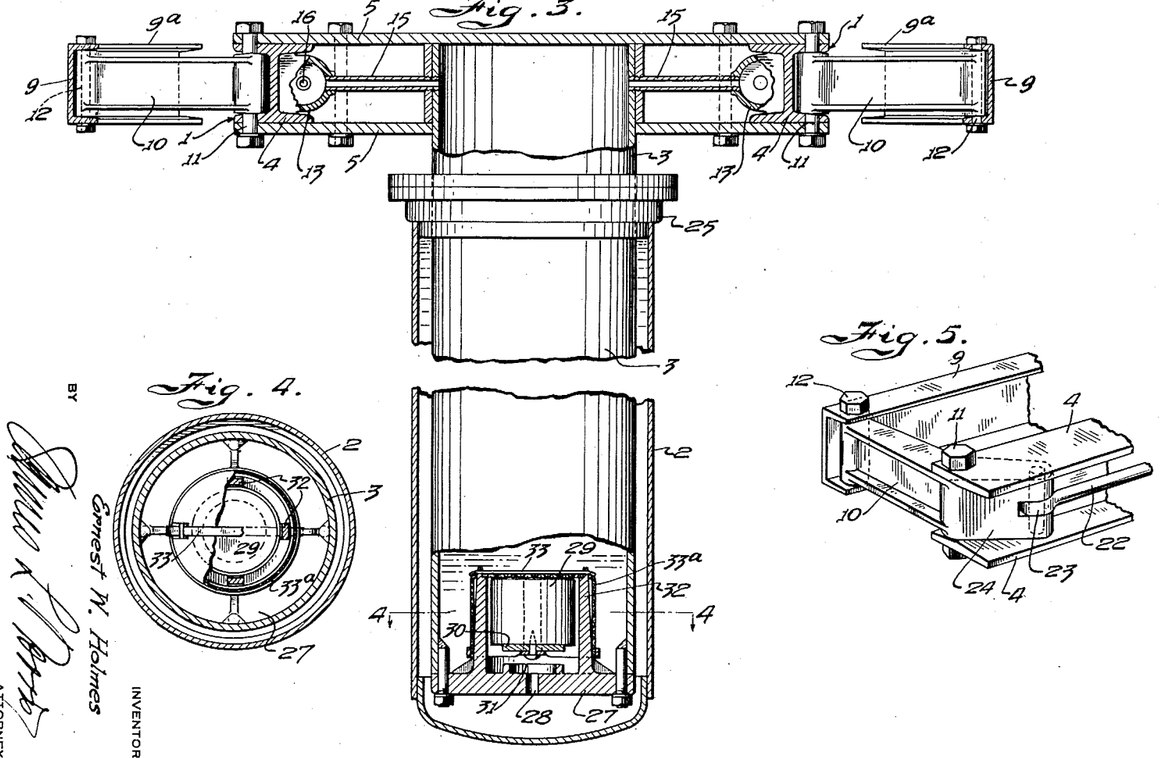
Figure 3 represents a vertical section taken on the line 3—3 of Figure 1, on an enlarged scale, portions of the hydraulic piston and cylinder being broken away.
Figure 4 represents a horizontal section taken transversely through the hydraulic piston and cylinder on the line 4—4 in Figure 3.
Figure 5 is a detail perspective view of an end of one of the side rails of the lifting frame and the adjacent end of the respective guide rail, showing one of the levers for extending and retracting the guide rail.

Such means as shown in Figures 2, 3 and 4 comprises a valve 29 which is constructed or composed of material which will cause it to float in the oil contained in the piston. This valve has a valve facing or disk 30 secured to its under side which is adapted to engage an annular valve seat 31 on the upper side of the head 27 and surrounding the oil transfer aperture 28 when the oil in the piston is of insufficient height to float the valve, the valve when submerged in the oil being held in a raised position with its valve facing 30 out of contact with the valve seat 31. A cage comprising a suitable number of arms 32 extend upwardly from the head 27 at different points around the valve and provide means for guiding it in properly centered position above the valve seat 31, and a cross member 33 fixed to a pair of these arms overlies the valve and prevents it from floating out of its cage under its buoyancy in the oil in which it is submerged. A strainer 33ª is preferably applied over and around the valve cage to preclude foreign matter from lodging beneath the valve and thus interfering with its proper operation, this strainer being removably held in place by the cross member 33 which extends across the top of the strainer.

In operation, the valve 29 will be supported by its buoyancy in raised position and out of contact with the valve seat 31 as long as the hollow piston contains sufficient oil to float the valve, and the valve will not interfere with the forcing of the oil out of the piston and into the cylinder for raising the lifting frame. However, as the piston approaches the limit of its upward stroke, the height of the oil therein becomes lowered and when there is insufficient height of oil in the piston to support the valve 29, the latter will descend and engage the valve seat 31 and thereby arrest further ascent of the piston by cutting off the further transfer of oil from the piston to the cylinder, and since this closing of the valve 29 takes place before the compressed air above the oil in the piston reaches the transfer port 28, air is prevented from reaching the under side of the piston. This valve will act automatically to limit the upward movement of the piston according to the amount of oil contained in the piston and cylinder. Ordinarily the piston is supplied with a sufficient quantity of oil to permit the piston to rise to its full desired height before the ascent is arrested by the closing action of the valve 29. In the event the body of oil has become depleted from leakage, evaporation or other causes, the valve will act automatically to stop the ascent of the piston after it has reached its maximum height determined by the amount of oil present and in either case the ascent of the piston will be arrested before the compressed air used in raising the piston can pass through the aperture 28 and reach the under side of the piston.

Figures 9, 10:
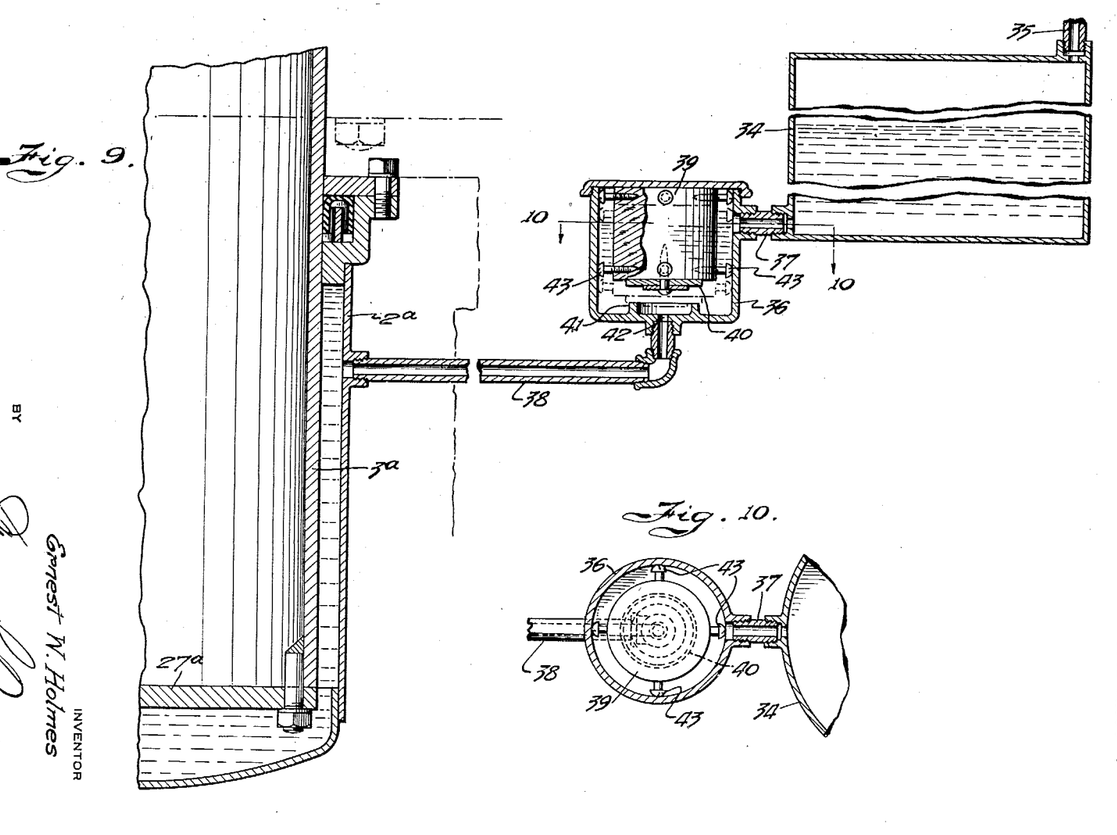
Figure 9 is a vertical sectional view of another form of hydraulic piston and cylinder and fluid pressure supply means for elevating the lifting frame.
Figure 10 represents a horizontal section taken on the line 10—10 of Figure 9.

Instead of forcing the oil from the hollow interior of the piston into the cylinder to raise the lifting frame, the lower end of the piston may be entirely closed and the oil or actuating fluid may be forced into the cylinder to raise the piston from a separate or extra supply tank, as in the construction contained in Figures 9 and 10 wherein the bottom of the piston 3ª is completely closed by the imperforate head 27ª and oil is forced into the cylinder 2ª from a tank 34 which is adapted to contain a body of oil or other suitable incompressible liquid and is adapted to receive compressed air from a compressed air supply pipe 35 which leads into the top thereof. In this instance a closed valve chamber 36 is interposed between the pipes 37 and 38 which connect the tank 34 to the cylinder 2ª, this valve chamber containing a float valve 39 which is buoyant in the oil and has a valve facing 40 on its lower side which is adapted to engage an annular valve seat 41 on the bottom of the chamber and surrounding outlet port 42 which communicates with the pipe 38. The valve is movable vertically in the valve chamber and is held therein by a suitable number of screws or projections 43 which project at different points around the circumference of the float and are adapted to slidably engage the interior vertical walls of the valve chamber.

In this instance, the piston 3ª is forced upwardly in the cylinder by introducing compressed air into the top of the tank 34 through the pipe 35, the compressed air then acting on the surface of the oil or liquid in the tank and forcing it through the bottom thereof through the valve chamber 36 and through the pipe 38 in the cylinder 2ª. While oil is passing through the valve chamber 36, the valve 39 which is buoyant in the oil will be held in its raised position as shown in the full lines and out of engagement with the valve seat 41 so that the valve will not interfere with the raising of the piston but when the supply oil in the tank 34 has become exhausted so that it no longer fills the valve casing 36, the valve 39 will descend into engagement with the valve seat 41 and will cut off the further supply of oil to the cylinder, thereby arresting the ascent of the piston and also preventing the entrance of compressed air to the cylinder. Ordinarily, the amount of oil supplied to the tank 34 will be determined by the height to which the piston is to rise so that the valve will act automatically to limit the ascent of the piston, and the valve will act automatically to prevent air reaching the cylinder irrespective of whether the tank 34 contains a full supply of oil or whether the supply of oil therein has become depleted by evaporation, leakage or other causes.

By providing the automobile wheel guides at the sides of the lifting frame which are extended equidistantly when the frame is fully lowered, transverse centering of the automobile on the lifting frame is insured when the automobile to be lifted is driven or otherwise brought into position above the frame, and hence, when the frame is raised to lift the automobile, the side rails of the lifting frame will engage beneath the flat or straight portion of the front axle of the automobile between the upwardly sloping knuckles or ends of the axle, and in consequence, there is no danger of side slipping of the automobile on the lifting frame as would take place if one or the other of the side rails of the frame engaged one of the upwardly sloping or offset knuckles at the ends of the front axle, and such transverse centering of the automobile on the lifting frame also insures the reception of the differential housing centrally on the rear portion of the lifting frame.

While the guide rails extend into close proximity to the inner sides of the automobile wheels while such rails are extended and the automobile is being driven into position above the fully lowered frame, engagement of these rails with the brake drums at the inner sides of the wheels or other parts of the automobile running gear, when the lifting frame is raised, is avoided, since these wheel guiding rails will be retracted against the sides of the lifting frame at the commencement of the lifting motion of the frame and before it comes into engagement with the automobile, the strength of the springs which extend the guide rails being insufficient to resist the fluid pressure required to lift the lifting frame to engage it with the automobile, and hence injury of the brake drums or other parts of the automobile running gear by the guide rails is avoided.

The retraction of the guide rails against the sides of the lifting frame and the maintenance of these rails in such retracted position while the lifting frame and an automobile resting thereon are elevated enables the front wheels of the elevated automobile to be swung in either direction, as in steering, and hence the steering mechanism may be inspected, tested and adjusted with facility and without interference from the guide rails.

The use of a single central cylindrical piston rotatable in its cylinder for raising the lifting frame enables the lift to be rotated on its vertical axis so that it can receive and discharge the automobiles in any desired angular direction on the floor or ground, and when the lift is so used, the guide rails will greatly assist in the proper placing of the automobiles thereover and the removal of the automobile therefrom.

I claim as my invention:—

1. In an automobile lift comprising a support and means for elevating it to lift an automobile, members movable outwardly from said support to cooperate with the wheels of an automobile to center it transversely with respect to said support, and means for withdrawing said members from the automobile wheels.

2. In an automobile lift comprising a support and power means for elevating it to lift an automobile, members mounted on said support to move outwardly therefrom and into positions to cooperate with the wheels of an automobile to center it transversely with respect to said support, and means operative by the setting of said power elevating means into operation for withdrawing said members from the automobile wheels preparatory to the elevation of said support.

3. In an automobile lift comprising a lifting member and means for elevating it to lift and support an automobile, rails mounted on said lifting member to move outwardly in opposite directions therefrom and into positions to cooperate with the wheels of an automobile to center it transversely with respect to said member, and means for drawing said rails toward one another to withdraw them relatively to the automobile wheels.

4. In an automobile lift comprising a lifting frame to engage beneath the axles of an automobile and means for raising said frame to lift an automobile while resting thereon, guide rails extending from said frame to cooperate with the wheels of an automobile to center it transversely above the frame, and means for retracting said rails when the frame is elevated.

5. In an automobile lift comprising a lifting frame to engage beneath the axles of an automobile, and means for raising said frame to lift an automobile while resting thereon, guide rails carried by said frame, means operative while the frame is lowered to extend said rails beyond the frame to cooperate with the wheels of an automobile and thereby center the latter transversely over said frame, and means operative when said frame is lifted to withdraw said rails from the automobile wheels.

6. In an automobile lift comprising a lifting frame to engage beneath the axles of an automobile, and power means for raising said frame to lift an automobile while resting thereon, guide rails on said frame, means operative while the frame is lowered to extend said rails relatively to the frame to engage between the wheels of an automobile and thereby center the latter transversely when brought into position above said frame, and means actuated by the setting of said power means into operation to retract said rails.

7. In an automobile lift comprising a lifting frame to engage beneath the axles of an automobile, and fluid pressure means for raising said frame to lift an automobile while resting thereon, guide rails mounted on the frame to move toward and from one another, means normally acting to move said rails apart to engage the inner sides of the wheels of an automobile and thereby center the latter transversely over said frame, and fluid pressure actuated means subject to the pressure of the fluid supplied to the fluid pressure means which raises the lifting frame for retracting said rails toward one another.

8. In an automobile lift comprising a lifting frame, fluid pressure elevating means therefor, and means for supplying fluid pressure thereto, automobile wheel engaging rails mounted on said frame to move toward and from one another, means for yieldingly moving said rails apart, and fluid pressure means actuated by fluid from said fluid pressure supply means for retracting said rails toward one another when the frame is elevated.

9. In an automobile lift comprising a lifting frame having fluid pressure means for elevating it, wheel guiding rails movably mounted on said frame, means normally acting to extend said rails outwardly relatively to the frame, and means connected to the fluid pressure elevating means for the frame and operative to retract said rails toward one another when said fluid pressure elevating means is operative to elevate the frame.

10. In an automobile lift comprising a lifting frame and means for elevating it, wheel guiding rails pivotally mounted on said frame to swing toward and from one another, springs connected to said rails and acting thereon to swing said rails from one another, and fluid pressure means connected to said rails and operative to retract said rails toward one another.

11. In an automobile lift comprising a lifting frame and means for elevating it, automobile wheel guiding rails, a plurality of levers pivotally mounted on the frame and pivotally connected to said rails for supporting the latter to swing toward and from one another, springs connected to said levers and operative to swing said rails from one another, and fluid pressure cylinders having pistons therein connected to said levers and operative against the action of said springs to retract said rails toward one another.

12. In an automobile lift comprising an automobile lifting frame, a cylinder in communication with a body of liquid, a piston reciprocable in the cylinder and connected to said frame for elevating it, and means for supplying compressed air to the surface of said body of liquid to raise said piston, a float valve buoyant in said body of liquid and supported in open position when submerged in said liquid to admit the liquid to the cylinder to raise the piston and movable into closed position when not submerged in said liquid to cut off the admission of liquid to the cylinder and thereby arrest the raising of the piston.

13. In an automobile lift comprising an automobile lifting frame, a cylinder, a hollow piston reciprocable in the cylinder and connected to said frame for elevating it, the piston and cylinder containing a body of liquid and the piston having an aperture toward its lower end for the flow of liquid from the piston to the cylinder, a float valve in the piston and controlling said aperture, said valve being buoyant in said liquid and supported in open position when submerged therein to admit liquid from the piston to the cylinder to raise the piston and movable into position to close said aperture when not submerged in said liquid and thereby arrest the raising of the piston.

14. In an automobile lift comprising an automobile lifting frame, a cylinder, a hollow piston reciprocable therein and connected to said frame for elevating it, the bottom of the piston having a head at its lower end provided with an aperture therethrough, the piston and cylinder containing a body of liquid, and means for supplying compressed air to the upper portion of the piston, a valve seat on the upper side of said piston head and surrounding said aperture, a float valve buoyant in said liquid to cooperate with said valve seat, and means on the piston head for retaining said valve in operative position above said valve seat.

In testimony whereof I have hereunto set my hand.

ERNEST W. HOLMES.